March 10, 1942.     K. ENGELSTED     2,275,516
MEAT CHOPPER
Filed Dec. 27, 1939     3 Sheets-Sheet 2

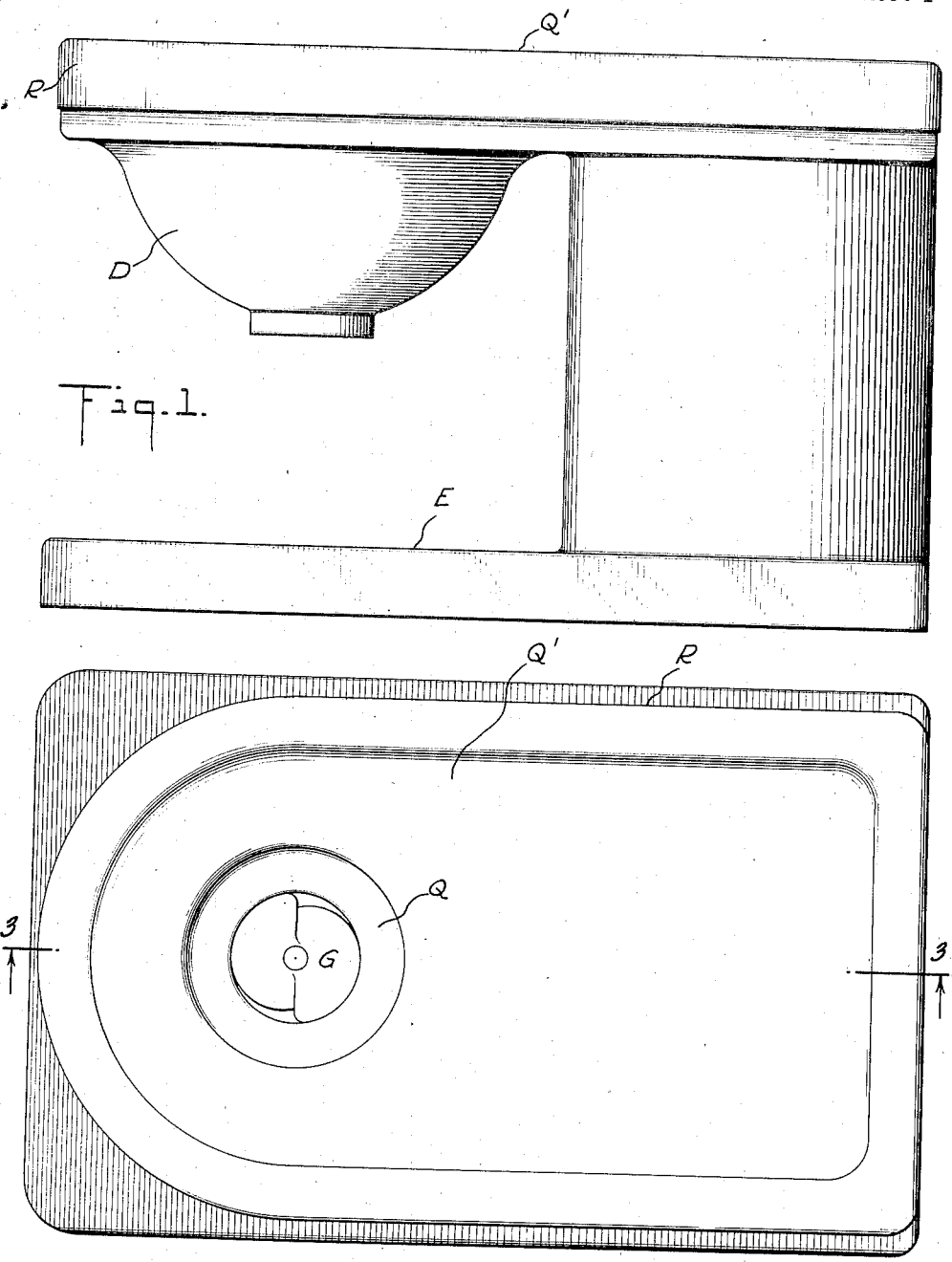

INVENTOR.
KNUD ENGELSTED
BY
ATTORNEY.

March 10, 1942. K. ENGELSTED 2,275,516
MEAT CHOPPER
Filed Dec. 27, 1939 3 Sheets-Sheet 3

INVENTOR.
KNUD ENGELSTED
BY
ATTORNEY.

Patented Mar. 10, 1942

2,275,516

UNITED STATES PATENT OFFICE 2,275,516

MEAT CHOPPER

Knud Engelsted, Riverside, Conn.

Application December 27, 1939, Serial No. 311,079

1 Claim. (Cl. 146—192)

This invention relates to choppers and has more particular reference to meat choppers.

One of the objects of the invention is to provide a more generally simplified and efficient chopper. Other objects will become apparent as the description of the particular embodiments chosen to illustrate the invention progresses.

Generally speaking the invention comprises a simplified and efficient arrangement in which the material to be chopped is fed to the chopper in a direction coaxial with the linear direction of the feed of the material through the chopper.

More specifically stated the invention comprises a chopper casing preferably dependently and vertically arranged in a machine frame or housing with a material intake coaxially arranged with respect to the chopper feed, the material entering the intake and pushing the material in the chopper feed in the direction in which it is being fed in the chopper and the chopped material dropping directly to receiving position from the chopper end.

While one embodiment of this invention is illustrated in the accompanying drawings, it is to be understood that such embodiments merely serve as an illustration of the underlying principles of the invention so that it may be readily comprehended by those skilled in the art, and is not intended as limiting the invention to the specific details disclosed therein.

In said drawings:

Fig. 1 is a side elevation of one form of the invention,

Fig. 2 is a top elevation of the form shown in Fig. 1,

Continuing now by way of a more detailed description and referring more particularly to the modification shown in Figs. 1 to 4 inclusive, a vertically arranged chopper or screw casing A has the conventional cutter and stationary plate B and C respectively located at one end thereof, the cutter rotating relatively to the plate C as will be readily understood. The chopper or screw casing A is secured in any convenient manner to a suitable support D which may be conveniently formed or cast with the machine base and motor housing E in which a suitable electric motor F for driving the chopper may be arranged preferably in parallel alignment with the chopper. A feed screw G having the usual coarse threads is rotatably located in the stationary dependent chopper casing A having longitudinally disposed vanes or scrapper blades A' contiguous to the periphery of the screw G. The latter is recessed at its upper end to an annular spoked drive member or pulley H bearing on one end and extending exteriorly of such casing. The pulley H is in turn driven by the belt K engaging the peripheral pulley groove edge J and motor pulley L. The pulley drive member H may be and preferably is guided on the flared end P' of the chopper casing A by a plurality of tapered roller bearings M held in bearing brackets N depending from and conveniently although not necessarily formed with the pulley drive member H. The tapered roller bearings M roll against the tapered bearing surface P formed on the underside of the annular flange or flared end P' and insuring axial centering of the pulley with respect to the chopper casing and maintaining the lower end of the screw G in close proximity to the cutter elements B and C.

In order to guide the material to be chopped to the screw G, a flared intake Q is coaxially aligned with the screw G, the flared intake being in the illustrated form conveniently formed in a sheet metal covering Q' which may also conveniently conceal the driving connections and afford a convenient work table top for the device. This table top may be conveniently set over the top of the frame casting of the machine, the dependent flange R of the top Q' overlying the machine frame casting and permitting the cover and intake to be easily removed.

Figure 3:
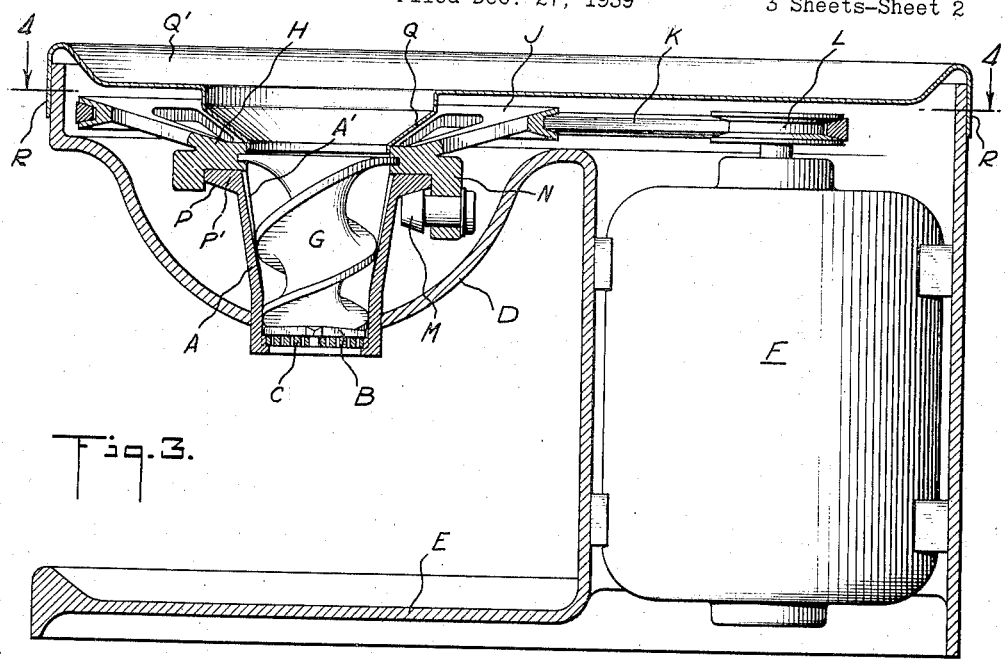
Fig. 3 is a vertical section of Fig. 2 on the line 3—3.
Figure 4:
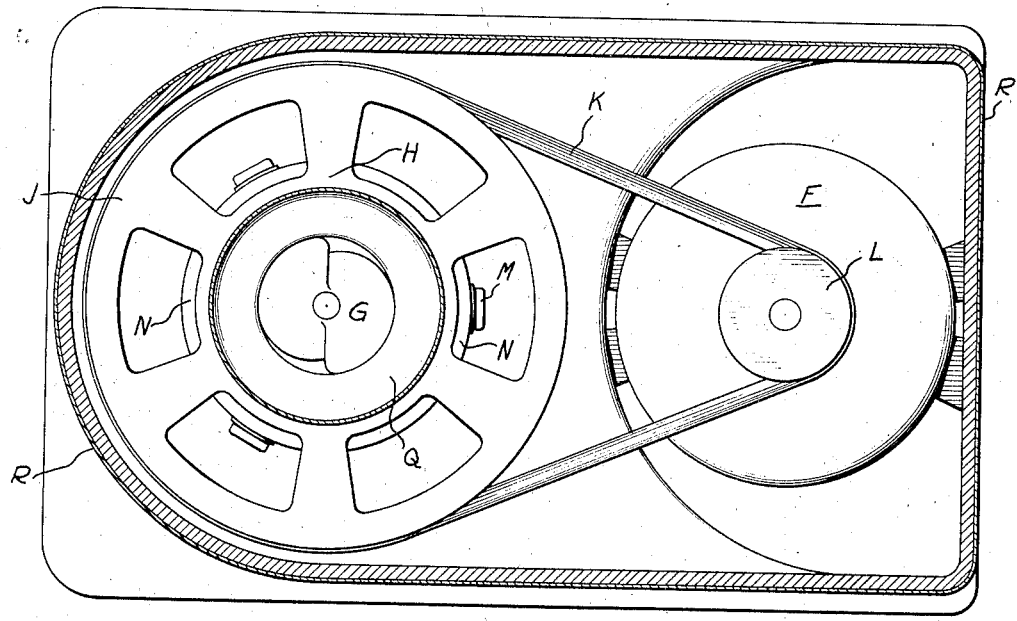
Fig. 4 is a section of Fig. 3 on the line 4—4.
Figure 5:
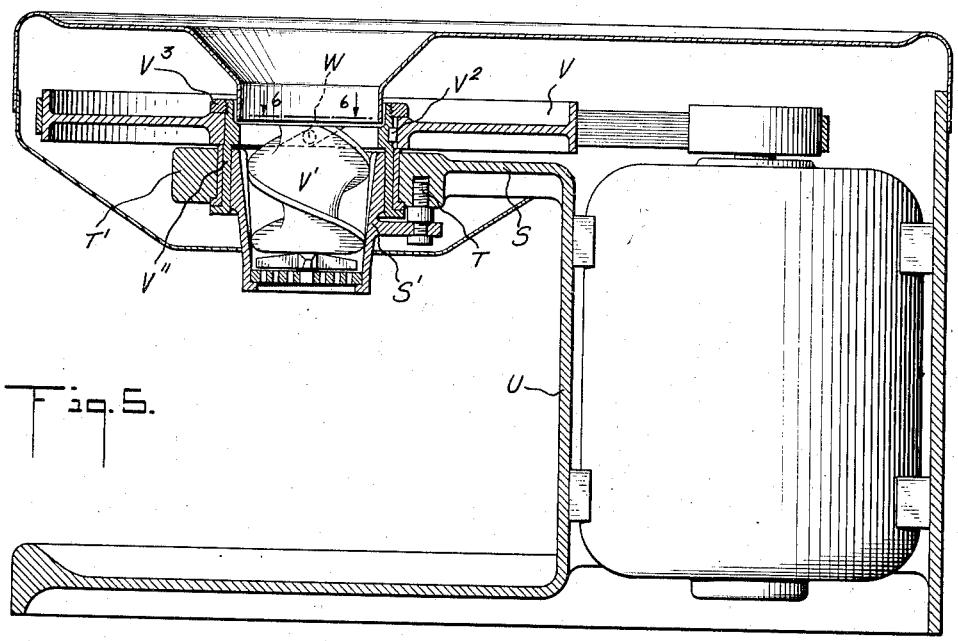
Fig. 5 is a vertical section of a modification and is a view similar to that shown in Fig. 3.
Figure 6:
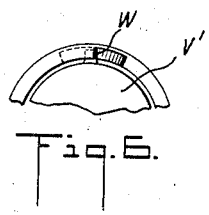
Fig. 6 is a fragmentary view looking down into the intake end of the chopper in the directions of the arrows shown in Fig. 5.

In the modification shown in Fig. 5 the chopper, motor, casting and work table are similarly arranged as shown in Figs. 1 to 4 inclusive, but differing from the modification shown in the Figs. 1 to 4 in the manner of supporting the screw, its casing and drive. In this modification the elevated and overhanging portion S of the casting forming the machine casing and motor housing U has the chopper casing S' bolted to the casting by bolt T tapping the collar T', the latter being formed with the machine casting and motor housing U. A pulley V for driving the screw V' is pinned at W by the pin and slot arrangement illustrated in Fig. 6 to the screw V', the pin and slot arrangement facilitating assembly. The pulley V is keyed to a dependent annular bearing V" at V² and locked to the bearing collar T' by ring or thrust nut V³, suitable babbitting being interposed between the bearing V" and the bearing collar T' as indicated.

Figure 7:
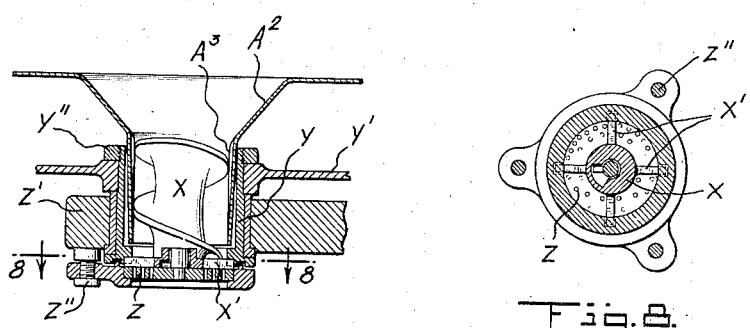
Fig. 7 is a further modification.
Figure 8:
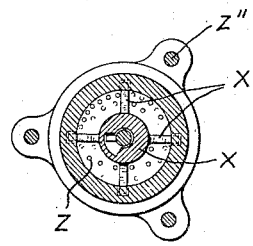
Fig. 8 is a section of Fig. 7 on the line 8—8.

In the modification shown in Figs. 7 and 8 the screw X is driven from its lower end instead of from its upper end as is the case in the two modifications heretofore described. The knife X' which is keyed to or otherwise connected to the screw X has the ends of its blades keyed or seated in suitable recesses formed in the annular upstanding bearing member or sleeve Y driven by the pulley Y' at its upper end and held in place by an annular ring nut or thrust collar Y" similar to that shown and described in connection with the construction shown in Figs. 5 and 6. The perforated stationary plate Z against which the knife X' acts and its support is bolted to the bearing collar Z' by one or more bolts Z" as will be readily understood. In this modification the chopper or knife casing is formed by extending the depending end or apron of the flared intake A² having scrapper blades A³ similar to that shown in Figs. 1 to 4 and functioning in much the same way.

It is claimed:

A meat chopper combining a casing having a fixed hopper outlet portion with an unobstructed intake at one end, and a plurality of longitudinally disposed and inwardly projecting vanes, a threaded screw within the casing and relatively rotatable to the intake end with the pitch at the end of the screw thread being such that a substantial portion of the end turn of the screw extends substantially horizontally across the hopper outlet portion, cooperating therewith and with the longitudinally extending vanes contiguous to the periphery of the screw threads to feed the material through the casing in a linear direction coaxial with the direction of feed of the material through the intake end of the casing, the vanes being coextensive with the screw over a substantial part of the length thereof, and means exteriorly of the casing for driving the screw.

KNUD ENGELSTED.